United States Patent
Cho (10) Patent No.: US 10,913,364 B2
(45) Date of Patent: Feb. 9, 2021

(54) ELECTRIC VEHICLE AND ELECTRIC VEHICLE POWER SWITCH METHOD

(71) Applicant: LIMOTEC (DongGuan) Limited, Guangdong Province (CN)

(72) Inventor: Kai-Han Cho, Taichung (TW)

(73) Assignee: LIMOTEC (DongGuan) Limited, Guangdong Province (CN)

(*) Notice: Subject to any disclaimer, the term of this patent is extended or adjusted under 35 U.S.C. 154(b) by 251 days.

(21) Appl. No.: 16/044,501

(22) Filed: Jul. 24, 2018

(65) Prior Publication Data
US 2019/0031047 A1 Jan. 31, 2019

(30) Foreign Application Priority Data
Jul. 25, 2017 (TW) ................ 106124944 A (51) Int. Cl.
*B60L 15/20* (2006.01)
*B62M 6/50* (2010.01)
(Continued)

(52) U.S. Cl.
CPC ............... *B60L 15/20* (2013.01); *B60C 9/00* (2013.01); *B60K 7/0007* (2013.01); *B62J 27/00* (2013.01); *B62K 3/002* (2013.01); *B62M 6/50* (2013.01); *A63C 17/12* (2013.01); *B60L 15/2045* (2013.01); *B60L 2200/12* (2013.01); *B60L 2200/24* (2013.01); *B60L 2240/421* (2013.01); *B60L 2240/423* (2013.01);
(Continued)

(58) Field of Classification Search
CPC .. B60L 15/20; B60L 15/2045; B60L 2200/12; B60L 2200/24; B60L 2240/421; B60L 2240/423; B60L 2240/427; B60L 2240/429; B60L 2260/26; B62M 6/50; B62J 27/00; B62J 45/10; B62J 45/40; B62J 50/20; B60K 7/0007; B60Q 9/00; A63C 17/12; B62K 11/00; B62K 2202/00; B62K 3/002; B62K 2204/00
See application file for complete search history.

(56) References Cited

U.S. PATENT DOCUMENTS

| | | | |
|---|---|---|---|
| 2004/0055796 A1 | 3/2004 | Kamen et al. | |
| 2014/0196968 A1 | 7/2014 | Bieler et al. | |
| 2019/0248439 A1* | 8/2019 | Wang | B62K 15/006 |

FOREIGN PATENT DOCUMENTS

| | | |
|---|---|---|
| TW | 481633 B | 4/2002 |
| TW | I584993 B | 6/2017 |

(Continued)

*Primary Examiner* — Kelly D Williams
(74) *Attorney, Agent, or Firm* — CKC & Partners Co., LLC (57) ABSTRACT

An electric vehicle includes a carrier, at least one wheel assembly, a driving module and a controlling module. The carrier is for carrying an user. The wheel assembly is disposed at the carrier and includes a wheel. The driving module includes a motor disposed at the wheel assembly. The driving module is for switching the motor and includes a sensing unit and a microprocessor. The sensing unit is electronically connected to the motor to detect at least one characteristic of the motor. The microprocessor is electronically connected to the motor. The microprocessor determines whether a predetermined conduction is satisfied according to the characteristic of the motor. When the predetermined conduction is satisfied, the motor is turned off by the microprocessor.

8 Claims, 8 Drawing Sheets

(51) Int. Cl.
  *B62K 3/00* (2006.01)
  *B60K 7/00* (2006.01)
  *B60Q 9/00* (2006.01)
  *B62J 45/10* (2020.01)
  *B62J 45/40* (2020.01)
  *B62J 50/20* (2020.01)
  *A63C 17/12* (2006.01)
  *B62K 11/00* (2006.01)
  *B62J 27/00* (2020.01)
  *B60C 9/00* (2006.01)

(52) U.S. Cl.
  CPC ... *B60L 2240/427* (2013.01); *B60L 2240/429* (2013.01); *B60L 2260/26* (2013.01); *B62J 45/10* (2020.02); *B62J 45/40* (2020.02); *B62J 50/20* (2020.02); *B62K 11/00* (2013.01); *B62K 2202/00* (2013.01); *B62K 2204/00* (2013.01)

(56) References Cited

FOREIGN PATENT DOCUMENTS

| | | |
|---|---|---|
| WO | 2016079614 A1 | 5/2016 |
| WO | 2017081547 A2 | 5/2017 |

\* cited by examiner

ELECTRIC VEHICLE AND ELECTRIC VEHICLE POWER SWITCH METHOD

RELATED APPLICATIONS

This application claims priority to Taiwan Application Serial Number 106124944, filed Jul. 25, 2017, which is herein incorporated by reference.

BACKGROUND

Technical Field

The present disclosure relates to an electric vehicle and an electric vehicle power switch method. More particularly, the present disclosure relates to an electric vehicle and an electric vehicle power switch method which provide power by a motor.

Description of Related Art

Scooters are popular among modern people, which include a carrier, a front wheel and a rear wheel. By creating a forward force, scooters can be moved forward.

In order to increase performance of scooters, the conventional scooter has a motor on the rear wheel. An electric power for scooters can be obtained after turning on the motor so as to save the user's energy.

However, when the user leaves the scooter by accident, the motor would not be turned off and still provide the electric power, and the scooter will be out of control.

Hence, how to improve the structure of an electric vehicle so as to increase the safety is a target of the industry.

SUMMARY

According to one embodiment of the present disclosure provides an electric vehicle which includes a carrier, at least one wheel assembly, a driving module and a controlling module. The carrier is for carrying an user. The at least one wheel assembly is disposed at the carrier and includes a wheel. The driving module includes a motor. The motor is disposed at the wheel assembly so as to drive the wheel. The controlling module is for switching the driving module, and includes a sensing unit and a microprocessor. The sensing unit is electronically connected to the motor for detecting at least one characteristic of the motor so as to provide at least one detecting signal. The microprocessor is electronically connected to the motor, wherein when the motor is turned on by the microprocessor to keep the electric vehicle at a constant speed, the microprocessor receives the detecting signal for obtaining the characteristic of the motor. The microprocessor determines whether a predetermined condition is satisfied according to the characteristic so as to determine whether the user leaves the carrier for removing a load, when the predetermined condition is satisfied, the motor is turned off.

According to another example of the embodiment of the present disclosure provides an electric vehicle which includes a carrier, at least one wheel assembly, a driving module and a controlling module. The carrier is for carrying an user. The at least one wheel assembly is disposed at the carrier and includes a wheel. The driving module includes a motor. The motor is disposed at the wheel assembly so as to drive the wheel. The controlling module is for switching the driving module and includes a sensing unit, an acceleration sensing unit and a microprocessor. The sensing unit is electronically connected to the motor for detecting at least one characteristic of the motor to provide at least one detecting signal. The acceleration sensing unit is signally connected to the microprocessor and detecting an acceleration of the electric vehicle to provide an acceleration signal. The microprocessor is electronically connected to the motor, and receiving the acceleration signal for obtaining the acceleration, wherein when the acceleration is less than a predetermined value or equal to zero, the motor is turned on by the microprocessor. When the microprocessor turns on the motor so as to keep the electric vehicle at a constant speed, the microprocessor receives the detecting signal for obtaining the characteristic of the motor, and the microprocessor determines whether a predetermined condition is satisfied according to the characteristic so as to determine whether the user leaves the carrier for removing a load. When the predetermined condition is satisfied, the motor is turned off by the microprocessor.

According to another example of the embodiment of the present disclosure provides an electric vehicle power switch method, which is for turning on or turning off an electric power of an electric vehicle. The electric vehicle includes a carrier, at least one wheel assembly, a driving module and a controlling module. The wheel assembly is disposed on the carrier. The driving module is disposed on the wheel assembly and includes a motor. The controlling module includes a sensing unit and a microprocessor. The electric vehicle power switch method includes a signal sensing process, a determining process and a stop process. In the signal sensing process, wherein when the microprocessor turns on the motor so as to keep the electric vehicle at a constant speed, the sensing unit detects at least one characteristic of the motor so as to provide at least one detecting signal to the microprocessor. In the determining process, wherein the microprocessor determines whether a predetermined condition is satisfied according to the characteristic so as to determine whether a user leaves the carrier for removing a load. In the stop process, wherein when the predetermined condition is satisfied, the motor is turned off by the microprocessor.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
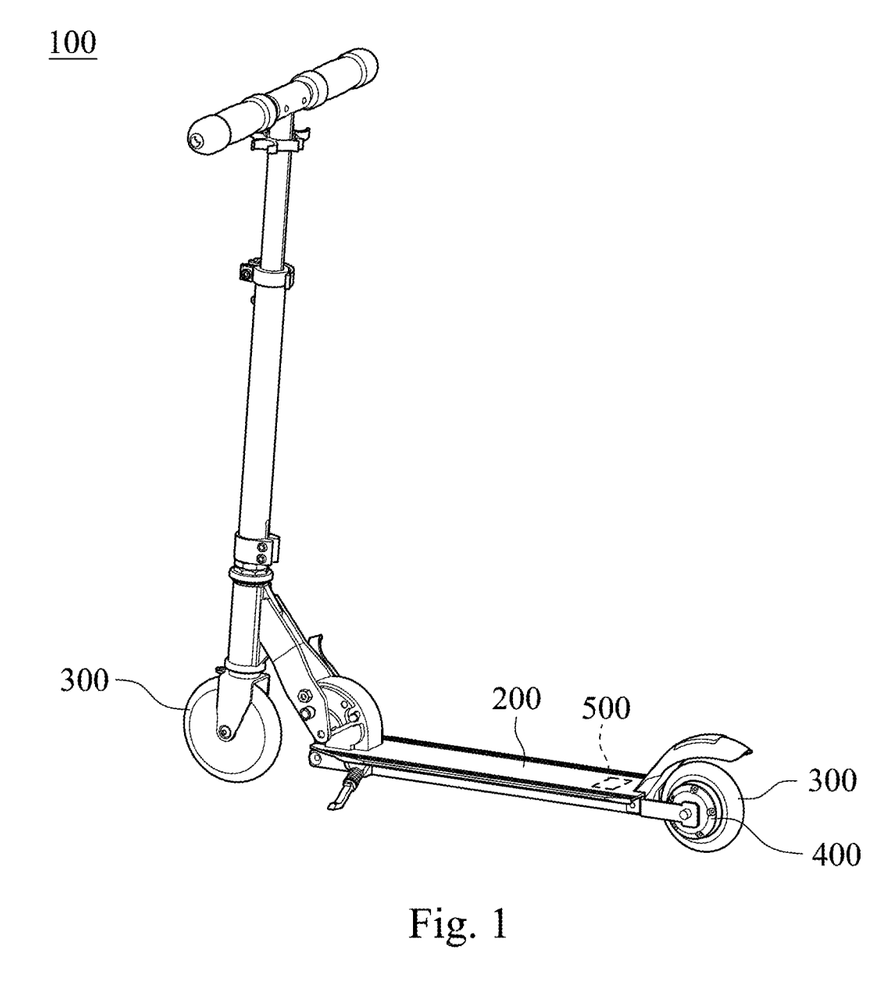
FIG. 1 shows the three-dimensional schematic view of an electric vehicle according to one embodiment of the present disclosure.
Figure 2:
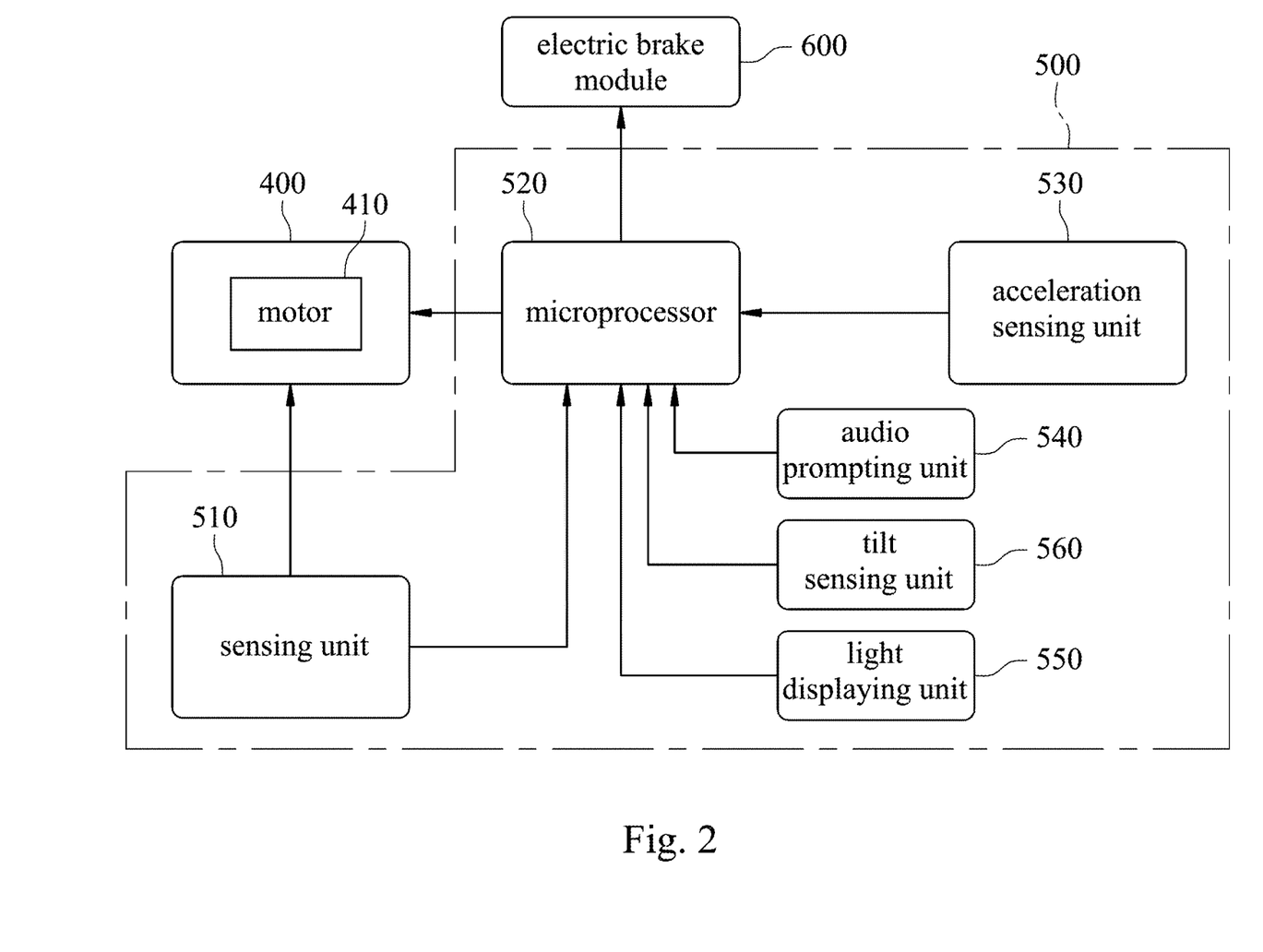
FIG. 2 shows the block diagram of the driving module, the controlling module and the electric brake module according to the embodiment of FIG. 1.

Please refer to FIG. 1 and FIG. 2, wherein FIG. 1 shows a three-dimensional schematic view of an electric vehicle 100 according to one embodiment of the present disclosure. FIG. 2 shows a block diagram of a driving module 400, a controlling module 500 and an electric brake module 600 of the electric vehicle 100 according to the embodiment of FIG. 1. The electric vehicle 100 includes a carrier 200, at least one wheel assembly 300, the driving module 400 and the controlling module 500. The carrier 200 is for carrying an user. The wheel assembly 300 is disposed at the carrier 200 and includes a wheel.

The driving module 400 includes a motor 410 disposed at the wheel assembly 300 so as to drive the wheel. The controlling module 500 is for switching the driving module 400 and includes a sensing unit 510 and a microprocessor 520. The sensing module 510 is electronically connected the motor 410 for detecting at least one characteristic of the motor 410 so as to provide at least one detecting signal. The microprocessor 520 is electronically connected to the motor 410. The microprocessor 520 receives the detecting signal for obtaining the characteristic of the motor 410. The microprocessor 520 determines whether a predetermined condition is satisfied according to the characteristic, and turns off the motor 410 when the predetermined condition is satisfied.

Therefore, the sensing unit 510 detects the characteristic of the motor 410 and determines whether the predetermined condition is satisfied according to the characteristic by microprocessor 520. When the predetermined condition is satisfied, the microprocessor 520 determines the user leaves the carrier 200 and turns off the motor 410, the safety of the electric vehicle 100 can be enhanced. The details of the electric vehicle 100 are stated below.

According to one example of the embodiment of FIG. 1, the electric vehicle 100 is a scooter, and the number of the wheel assembly 300 is two, wherein one of the wheel assemblies 300 is disposed at a front end of carrier 200, and the other one of the wheel assemblies 300 is disposed at a rear end of carrier 200. According to another example of the embodiment of FIG. 1, the electric vehicle 100 can be a skateboard or a snakeboard, and the present disclosure will not be limited thereto.

The motor 410 can be a wheel hub motor. The motor 410 disposed at a wheel axis of the wheel assembly 300 so as to drive the wheel. According to another example of the embodiment of FIG. 1, the driving module 400 can include a linkage unit, the linkage unit is driven by the motor 410 so as to drive the wheel, and the present disclosure will not be limited thereto.

The microprocessor 520 is electronically connected to the motor 410 so as to switch the motor 410. When the driving module 400 is turned on and provides an electric power to the electric vehicle 100, the microprocessor 520 assesses the motor 410 to receive an input power and work. The motor 410 receives the input power and generate a current, and the sensing unit 510 can detect the characteristic of motor 410 so as to provide the detecting signal. In other words, the characteristic detected by the sensing unit 510 can be at least one of the current, a voltage, a rotational speed and an output torque.

According to the example of the embodiment of FIG. 1, the number of the characteristic is one, and the characteristic is a current. Therefore, the sensing unit 510 can include a current sensor so as to detect the current of the motor 410. In general, when a load is changed, the current will change. When the load is generated, the current will decrease instantaneously. Therefore, the microprocessor 520 determines whether the user leaves the carrier 200 by detecting the current. When the user leaves the carrier 200, the microprocessor 520 turns off the electric power of the motor 410 so as to avoid danger.

In detail, an output torque formula of the motor 410 is $T=I \times Kt$, wherein T is an output torque value of the motor 410, Kt is an induced electromotive force constant of the motor 410, I is the current value of the motor 410. When the user stands on the carrier 200, the user's weight will produce the load, and when the user leaves the carrier 200 for removing the load, the output torque value T of the motor 410 will decrease instantaneously and the current value I can be decreased.

Figure 3:
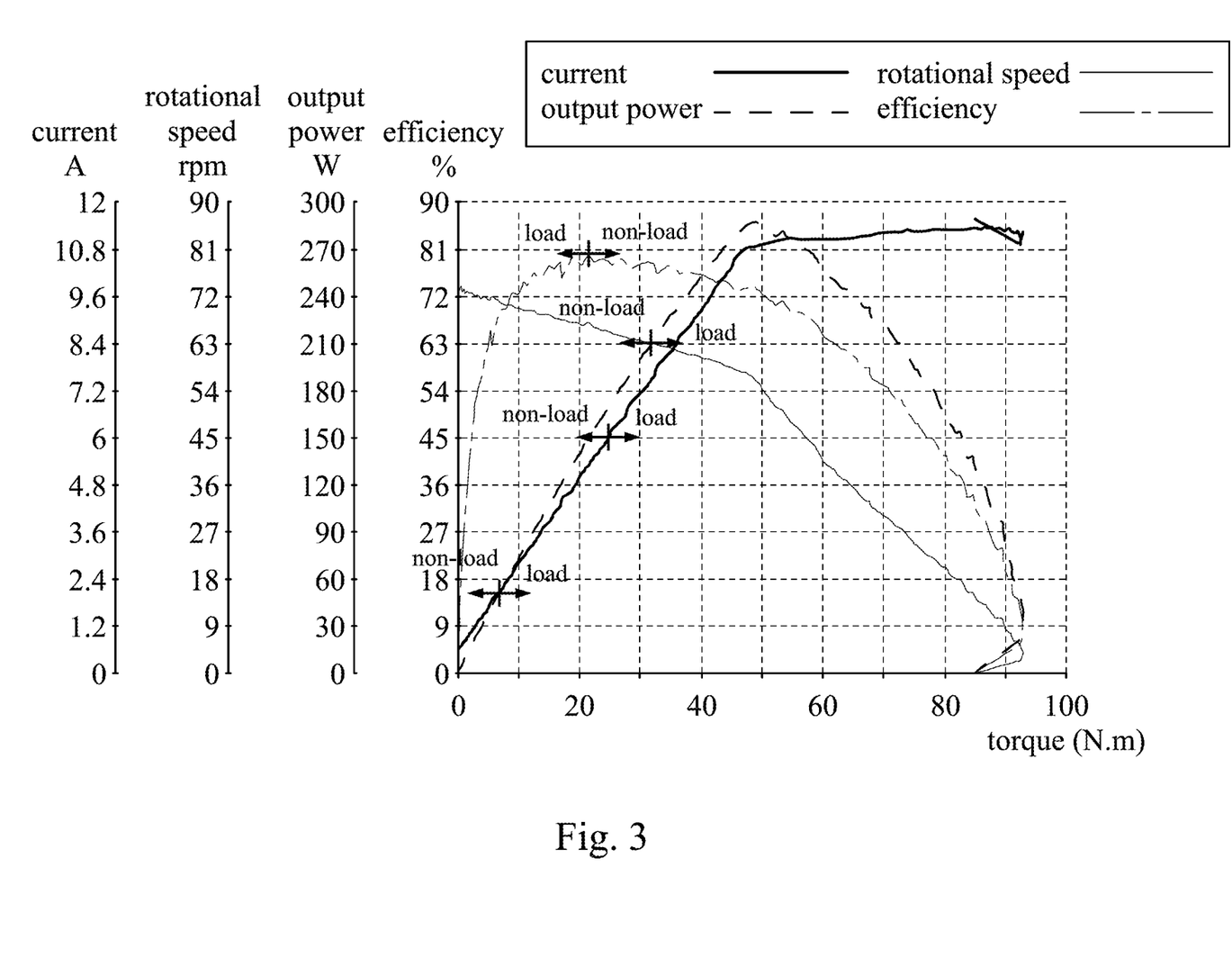
FIG. 3 shows the motor characteristic curve diagram according to the embodiment of FIG. 1.

Please refer to FIG. 3, and also refer to FIG. 1 and FIG. 2, wherein FIG. 3 is a characteristic curve diagram of the motor 410 of the electric vehicle 100 according to the embodiment of FIG. 1. In FIG. 3, the characteristic curves of the motor 410 under loading states or unloading states are shown, and the predetermined condition can be set according to FIG. 3. According to the embodiment of FIG. 1, the characteristic is the current, and the predetermined condition is $I<6$ amps. The microprocessor 520 determines whether to turn off the motor 410 according to the comparison between the current value I and the predetermined condition. For example, when the microprocessor 520 receives the detecting signal and obtains the current value I of the motor 410 which is 2 amps, that is, the predetermined condition is satisfied, so that the microprocessor 520 determines the user leaves the carrier 200 and turns off the motor 410. When the microprocessor 520 receives the detecting signal and obtains the current value I of motor 410 which is 7 amps, that is, the predetermined condition is not satisfied, the microprocessor 520 will not turn off the motor 410. The microprocessor 520 determines that the user still stands on the carrier 200, and keeps the motor 410 working.

According to another embodiment, the number of the characteristic is one, and the characteristic is a rotational speed. The sensing unit 510 can include a rotational speed sensor so as to detect the rotational speed of the motor 410. In FIG. 3, the predetermined condition can be $\omega>63$ rpm. When the motor 410 is controlled by the voltage or a torque, a low-load voltage will decrease, so that the rotational speed can be increased.

According to another example of the embodiment of FIG. 1, the number of the characteristic is two, and the two characteristics are a rotational speed and an output torque. The sensing unit 510 can include a rotational speed sensor and a torque sensor. The rotational speed sensor detects the rotational speed of the motor 410, and the torque sensor detects the output torque of the motor 410. The microprocessor 520 converts the characteristics into an output power according to $P=T\omega$, wherein P is an output power value of the motor 410, $\omega$ is a rotational speed value of the motor 410, and T is an output torque value of the motor 410. In FIG. 3, the predetermined condition is $P<45$ W.

According to further another example of the embodiment of FIG. 1, the number of the characteristic is four, and the four characteristics are a voltage, a current, a rotational speed and an output torque. The microprocessor 520 converts the characteristics into an output efficiency according to $\eta=T\omega/VI$, and the predetermined condition is $\eta<80\%$, wherein $\eta$ is an output efficiency value of the motor 410, T is an output torque value of the motor 410, V is an input voltage value of the motor 410, and I is a current value of the motor 410.

According to yet another example of the embodiment of FIG. 1, the controlling module 500 can further include an acceleration sensing unit 530 signally connected to the microprocessor 520. The acceleration sensing unit 530 detects an acceleration of the electric vehicle 100 so as to provide an acceleration signal. The microprocessor 520 receives the acceleration signal for obtaining the acceleration. When the acceleration is less than a predetermined value or the acceleration is equal to zero, the microprocessor 520 turns on the motor 410. In detail, when the user stands on the electric vehicle 100, and the user creates a forward force to move the electric vehicle 100 before the motor turned on. When the acceleration sensing unit 530 detects the acceleration is less than the predetermined value or the acceleration is equal to zero, that is, the speed generated by the user approaches a highest speed or starts to slow down. At this time, the microprocessor 520 can turn on the motor 410 so as to provide the electric power and keep the highest speed as a constant of the electric vehicle 100.

According to the example of the embodiment of FIG. 1, the motor 410 is the wheel hub motor so as to drive the wheel directly, so that the acceleration of the motor 410 is equal to the acceleration of the electric vehicle 100. Therefore, the acceleration of the electric vehicle 100 can be obtained by calculating the acceleration of the motor 410, and the user can be informed whether a forward force is created by foot to move the electric vehicle 100 by the acceleration of the motor 410.

Hence, the method for controlling the motor 410 to provide an output power so as to keep a constant speed is provided, which can ensure the accuracy of the detection of the load by the characteristic curve of the motor 410.

The controlling module 500 can further include a tilt sensing unit 560 signally connected to the microprocessor 520. The tilt sensing unit 560 detects a tilt condition of the electric vehicle 100 so as to provide a tilt signal, wherein the microprocessor 520 receives the tilt signal so as to determine whether to turn off the motor 410. It is dangerous during the electric vehicle 100 turns with high speed, the electric vehicle 100 would tilt by the way to turn. Therefore, a tilt condition of the electric vehicle 100 can be detected by the tilt sensing unit 560 so as to provide a tilt signal, and the microprocessor 520 can turn down or turn off a boost of the motor 410 so as to decrease the danger.

The electric vehicle 100 can further include an electronic brake module 600 connected to the wheel assembly 300 so as to brake the wheel assembly 300. The electronic brake module 600 is electrically connected to the microprocessor 520, wherein when the motor 410 is turned off by the microprocessor 520, the electronic brake module 600 is activated so as to brake the wheel assembly 300. In other words, when the motor 410 is turned off by the microprocessor 520, the microprocessor 520 turns off the electric power of the motor 410 first, and then the electronic brake module 600 starts to brake the wheel assembly. It is favorable for avoiding the same strength of the brake to make the user uncomfortable by adjusting the strength of the electronic brake with time.

According to another example of the embodiment of FIG. 1, it is dangerous for the user when the electric power of the electric vehicle 100 is provided too fast, thus the controlling module 500 can further include an audio prompting unit 540 and a light displaying unit 550. The audio prompting unit 540 and the light displaying unit 550 are disposed on the carrier 200 and electrically connected to the microprocessor 520. When the electric power of the electric vehicle 100 provides too fast, the audio prompting unit 540 and the light displaying unit 550 will prompt the user, so as to decrease the danger of the user.

Furthermore, the constant speed of the motor 410 can be controlled to turn down with time or to let the motor 410 back to a best efficiency point gradually. For example, the best efficiency can be set, and a best efficiency range can be set automatically when the motor 410 is turned on, and the best efficiency range can be adjusted according to the load. Such as, when a current speed is at 70 rpm and the best efficiency point is 65 rpm, the speed will be adjusted to 65 rpm slowly during driving.

Figure 4:
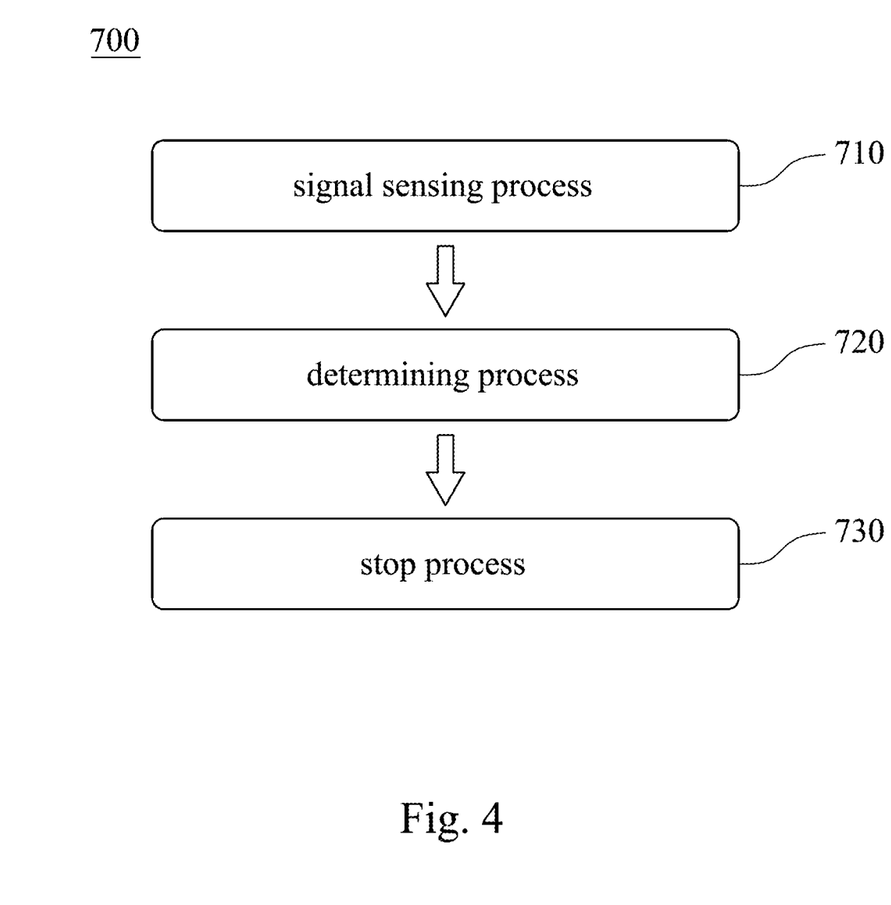
FIG. 4 shows the step flow chart of an electric vehicle power switch method according to another embodiment of the present disclosure.

Please refer to FIG. 4, and also refer to FIG. 1 to FIG. 3, wherein FIG. 4 shows a flow diagram of an electric vehicle power switch method 700 according to another embodiment of the present disclosure. The electric vehicle power switch method 700 includes a step 710, a step 720 and a step 730.

The step 710 is a signal sensing process. When the microprocessor 520 turns on the motor so as to keep the electric vehicle 100 at a constant speed, the sensing unit 510 detects at least one characteristic of the motor 410 so as to provide at least one detecting signal to the microprocessor 520.

The step 720 is a determining process. The microprocessor 520 determines whether the predetermined condition is satisfied according to characteristic so as to determine whether a user leaves the carrier 200 for removing the load.

The step 730 is a stop process. When the predetermined condition is satisfied, the microprocessor 520 turns off the motor 410.

Thereby, the microprocessor 520 determines whether the predetermined condition is satisfied in the determining process 720. When the predetermined condition is satisfied, the microprocessor 520 turns off the motor 410 so as to increase the safety of the electric vehicle 100.

In detail, in the signal sensing process of the step 710, the sensing unit 510 can detect one characteristic, two characteristics or four characteristic, and the characteristics can be at least one of the voltage, the current, the rotational speed and the output torque.

In the determining process of the step 720, the microprocessor 520 compares the characteristic with the predetermined condition so as to determine whether the predetermined condition is satisfied. For example, the characteristic can be the current, the microprocessor 520 determines whether the predetermined condition I<6 amps is satisfied. Or, the characteristic can be the rotational speed, the microprocessor 520 determines whether the predetermined condition $\omega>63$ rpm is satisfied.

The microprocessor 520 can convert the characteristics, and then compare with the predetermined condition. For example, the characteristics are the rotational speed and the output torque, the microprocessor 520 can convert the characteristic into the output power according to $P=T\omega$, and determine whether the predetermined condition P<45 W is satisfied. Or, the characteristics are the voltage, the current, the rotational speed and the output torque, the microprocessor 520 converts the characteristics into the output efficiency according to $\eta=T\omega/VI$, and determine whether the predetermined condition $\eta<80\%$ is satisfied.

Figure 5:
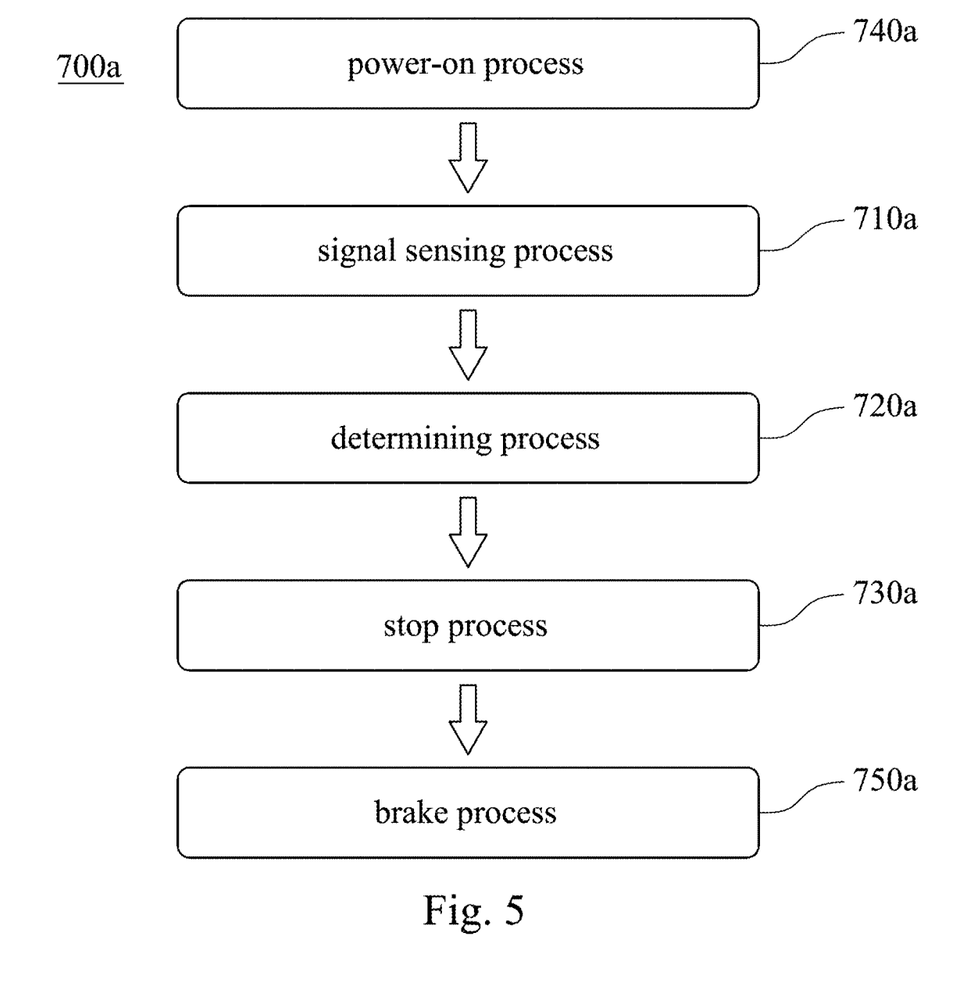
FIG. 5 shows the step flow chart of an electric vehicle power switch method according to further another embodiment of the present disclosure.

Please refer to FIG. 5, wherein the FIG. 5 shows a flow diagram of an electric vehicle power switch method 700a according to another embodiment of the present disclosure.

The electric vehicle power switch method 700a includes a step 710a, a step 720a, a step 730a, a step 740a and a step 750a, wherein the step 710a, the step 720a and the step 730a are the same as the step 710, the step 720 and the step 730 according to FIG. 4, and will not be described again herein.

The step 740a is a power-on process. The acceleration sensing unit 530 detects the acceleration of electric vehicle 100 before the motor 410 is turned on so as to provide an acceleration signal to the microprocessor 520. When the acceleration is less than the predetermined value or the acceleration is equal to zero, the microprocessor 520 turns on the motor 410.

The step 750a is a brake process, when the motor 410 is turned off, the electronic brake module 600 is activated so as to brake the wheel assembly 300.

When the motor 410 is controlled by the constant speed, the current will decrease after the user leaves the carrier 200 for removing the load. When the current is less than a constant value, the electric power of the motor 410 can be turned off. When the motor 410 is controlled by the voltage, a low-load current decreases and the rotational speed increases, thus the predetermined condition can also be set according to the characteristic of the motor 410. When the motor 410 is controlled by the torque, the rotational speed increases with low-load, and it is favorable for determining whether the user leaves the carrier 200 so as to turn off the electric power of the motor 410.

Figure 6:
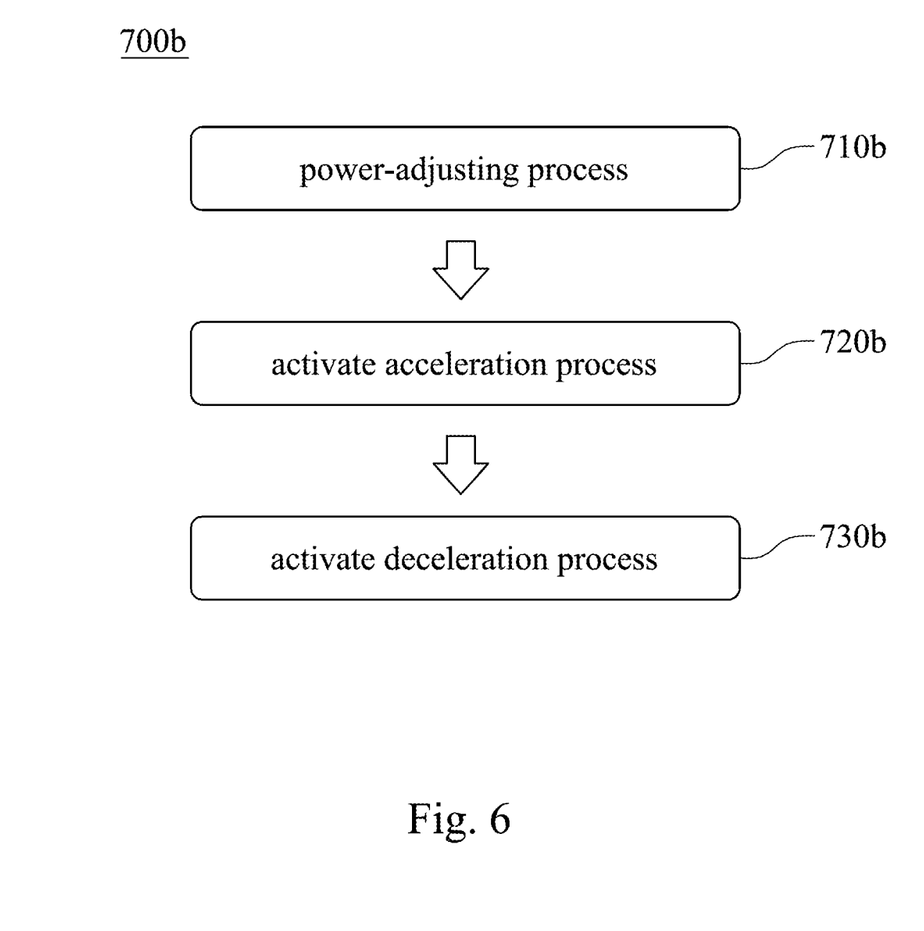
FIG. 6 shows a flow diagram of an electric vehicle power switch method according to one embodiment of the present disclosure.
Figure 7:
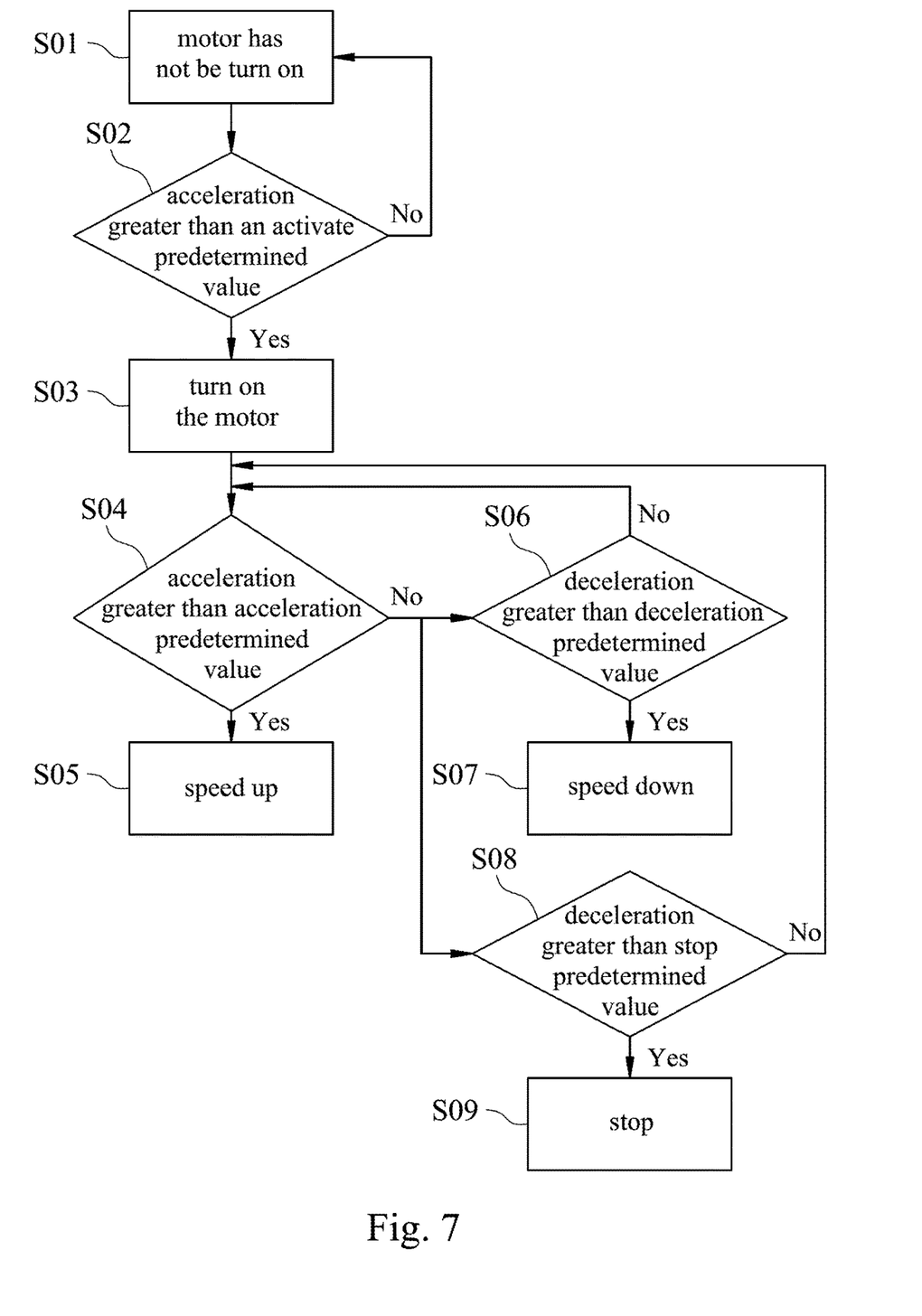
FIG. 7 shows another flow diagram of an electric vehicle power switch method according to FIG. 6.
Figure 8:
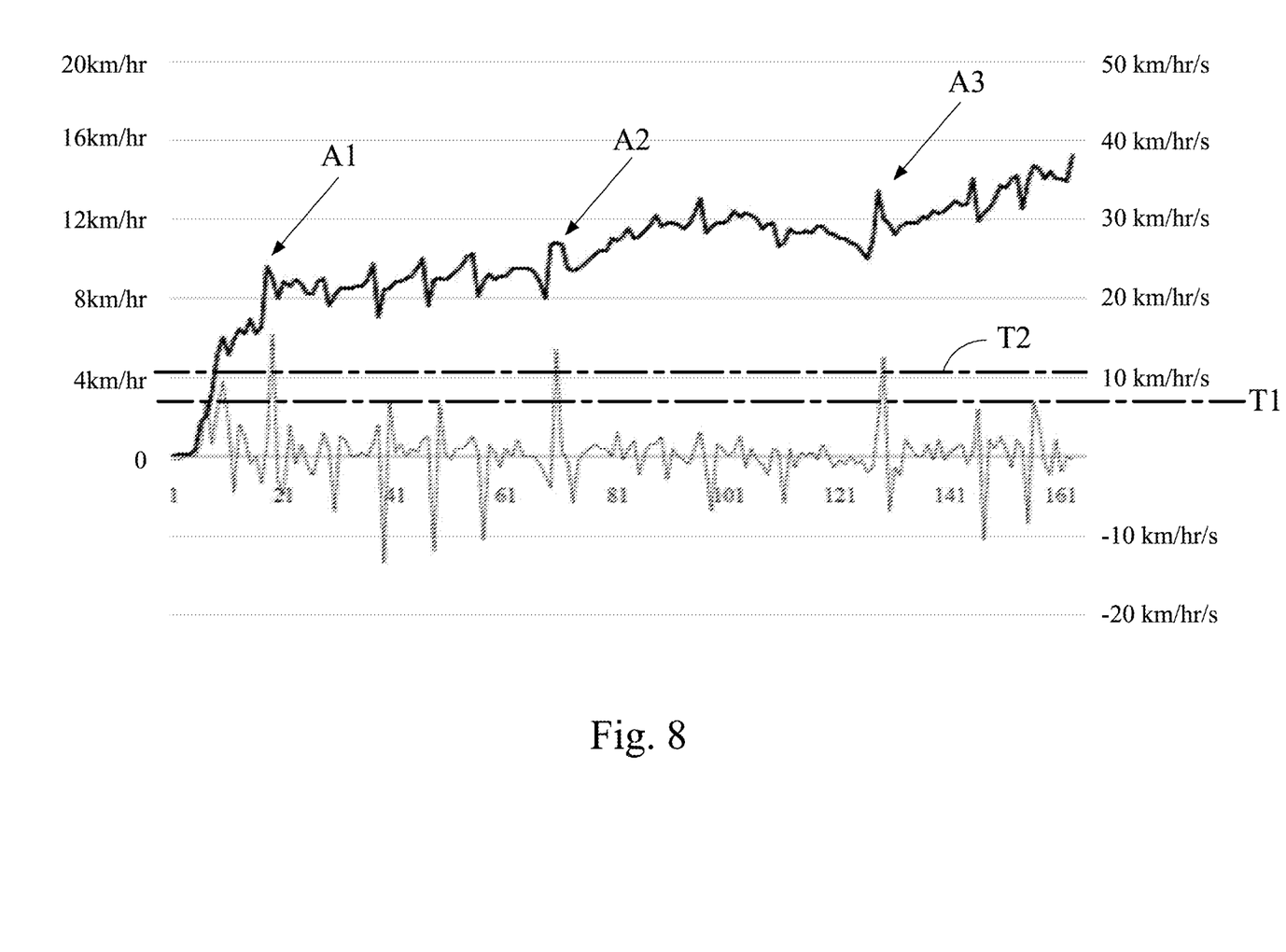
FIG. 8 is a diagram showing the relationship between a speed and an acceleration and the relationship between a speed and a deceleration of the electric vehicle.

Please refer to FIG. 6, FIG. 7 and FIG. 8. FIG. 6 shows a flow diagram of an electric vehicle power switch method according to one embodiment of the present disclosure, FIG. 7 shows another flow diagram of an electric vehicle power switch method according to FIG. 6, and FIG. 8 is a diagram showing the relationship between a speed and an acceleration and the relationship between a speed and a deceleration of the electric vehicle 100. The electric vehicle power switch method 700b includes a power-adjusting process 710b, an activate acceleration process 720b and an activate deceleration process 730b.

In the power-adjusting process 710b, the sensing unit 530 detects a speed condition of electric vehicle 100 so as to provide a detecting signal to the microprocessor 520, when the microprocessor 520 keeps the electric vehicle 100 at a constant speed. In the activate acceleration process 720b, when the microprocessor 520 receives the detecting signal for obtaining an acceleration value of a speed condition, and then the motor 410 provides a boost or the boost of motor 410 can be increased, that is the microprocessor 520 can increases the speed of the electric vehicle 100 and then keeps the electric vehicle at an update constant speed. In activate deceleration process 730b, when the microprocessor 520 receives the detecting signal for obtaining a deceleration value of the speed condition, and then the boost of the motor can be turned off or turned down, that is the microprocessor 520 can decrease the speed of the electric vehicle 100 and then keeps the electric vehicle 100 at the update constant speed.

In detail, as shown in FIG. 6, in a step S01, the motor 410 has not be turned on, at this time, the user creates a forward force to move the electric vehicle 100 by foot. In the power-adjusting process 710b, the sensing unit 530 detects the speed condition of the electric vehicle 100. In the activate acceleration process 720b, the microprocessor 520 receives the acceleration of the electric vehicle 100. In a step S02, the microprocessor 520 determine whether the acceleration greater than an activate predetermined value. When the acceleration is greater than the activate predetermined value, the microprocessor 520 turns on the motor 410 so as to provide the boost of the motor 410 in a step S03; otherwise, the motor 410 is not turned on.

When the motor 410 is turned on, the sensing unit 530 keeps to detect the speed condition of the electric vehicle 100. In the activate acceleration process 720b, the microprocessor 520 receives the acceleration of the electric vehicle 100, and the microprocessor 520 determines whether the acceleration is greater than an acceleration predetermined value in a step S04. When the acceleration is greater than the acceleration predetermined value, the microprocessor 520 increases the boost of the motor 410 in a step S05. When the acceleration is greater than the acceleration predetermined value, the microprocessor 520 can increase the boost of the motor 410 quantitatively, that is, in every time, the acceleration greater than the acceleration predetermined value is detected, the increased boost is the same.

Otherwise, in the activate deceleration process 730b, when the microprocessor 520 receives the deceleration, the microprocessor 520 determines whether the deceleration greater than a deceleration predetermined value in a step S06. When the deceleration is greater than the deceleration predetermined value, the microprocessor 520 decreases the boost of the motor 410 quantitatively in a step S07; or, the microprocessor 520 determines whether the deceleration is greater than a stop predetermined value. When the deceleration is greater than the stop predetermined value, the microprocessor 520 turns off the boost of the motor 410 in a step S09. The values of the deceleration, the stop predetermined value and the deceleration predetermined value are compared in absolute values, and the deceleration predetermined value is less than the stop predetermined value.

In the other words, the user can hold the handle and stand on the carrier 200 of the electric vehicle 100 at a safe condition so as to control the boost with a stable motion. When the user pulls the handle or leans backward, an instant deceleration effect is generated according to an inertial force, at this time, the sensing unit 530 detects the speed condition of the electric vehicle 100 for obtaining the deceleration. Otherwise, when the user pushes the handle or leans forward, an instant accelerated effect is generated according to an inertial force, and the sensing unit 530 detects the speed condition of the electric vehicle 100 for obtaining the acceleration. Through the power-adjusting process 710b, the speed of the electric vehicle 100 is detected so as to convert the user's motion into the detecting signal, and then the microprocessor 520 would turn on, adjust or turn off the boost of the motor 410 in accordance with the detecting signal. In FIG. 8, a solid line shows the speed of the electric vehicle 100, corresponding to the left vertical axis. A dashed line shows the acceleration or the deceleration of the electric vehicle 100 (that is, the acceleration is represented in positive value, the deceleration is represented in negative value), corresponding to the right vertical axis, the horizontal axis represents time. When the acceleration is greater than activate predetermined value T1, the motor 410 provides the boost. When the acceleration is greater than the acceleration predetermined value T2, the motor 410 increase the boost so as to increases the speed of the electric vehicle 100, such as an accelerated point A1. Therefore, when the acceleration is greater than the acceleration predetermined value, the speed of the electric vehicle 100 is increased, such as an accelerated point A2 and an accelerated point A3. Due to the deceleration is not greater than the deceleration predetermined value or the stop predetermined value, so the electric vehicle 100 would not be decelerated and stopped.

Hence, the electric vehicle and the electric vehicle power switch method of the present disclosure can determine whether the user leaves the carrier 200 so as to turn off the motor 410 by the characteristic of the motor 410, and the purposes of simple structure and low costs can be achieved without a load sensing unit.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electric vehicle, comprising:
   a carrier for carrying a user;
   at least one wheel assembly disposed at the carrier and comprising a wheel;
   a driving module comprising a motor disposed at the wheel assembly so as to drive the wheel;
   a current sensor electronically connected the motor for detecting at least one characteristic of the motor so as to provide at least one detecting signal; and
   a microprocessor electronically connected to the motor, wherein when the motor is turned on by the microprocessor to keep the electric vehicle at a constant speed, the microprocessor receives the detecting signal for obtaining the characteristic of the motor, and the microprocessor determines whether a predetermined condition is satisfied according to the characteristic so as to determine whether the user leaves the carrier for removing a load, wherein a number of the characteristic is one, the characteristic is a current, and the predetermined condition is I<6 amps, wherein I is a current value of the motor;
   when the predetermined condition is satisfied, the motor is turned off.

2. The electric vehicle of claim 1, further comprising an audio prompting unit and a light displaying unit, the audio prompting unit and the light displaying unit disposed on the carrier and electrically connected to the microprocessor.

3. The electric vehicle of claim 1, further comprising:
   an electronic brake module connected to the wheel assembly so as to brake the wheel assembly, and the electronic brake module electrically connected to the microprocessor;
   wherein when the motor is turned off by the microprocessor, the electronic brake module is activated so as to brake the wheel assembly.

4. An electric vehicle power switch method, which is for turning on or turning off an electric power of an electric vehicle, the electric vehicle comprising a carrier, at least one wheel assembly, a driving module, a current sensor and a microprocessor, the wheel assembly disposed on the carrier, the driving module disposed on the wheel assembly and comprising a motor, the electric vehicle power switch method comprising:
   a signal sensing process, wherein when the microprocessor turns on the motor so as to keep the electric vehicle at a constant speed, the current sensor detects at least one characteristic of the motor so as to provides at least one detecting signal to the microprocessor;
   a determining process, wherein the microprocessor determines whether a predetermined condition is satisfied according to the characteristic so as to determine whether a user leaves the carrier for removing a load, wherein a number of the characteristic is one, the characteristic is a current, and the predetermined condition is I<6 amps, wherein I is a current value of the motor; and
   a stop process, wherein when the predetermined condition is satisfied, the motor is turned off by the microprocessor.

5. The electric vehicle power switch method of claim 4, wherein the electric vehicle further comprises:
   an electronic brake module connected to the wheel assembly, and the electric vehicle power switch method further comprises:
   a brake process, wherein when the motor is turned off, the electronic brake module is activated so as to brake the wheel assembly.

6. The electric vehicle power switch method of claim 4, wherein the electric vehicle is a scooter, a skateboard or a snakeboard.

7. The electric vehicle power switch method of claim 4, further comprising:
   a power-adjusting process, wherein a speed condition of the electric vehicle is detected and a detecting signal is provided to the microprocessor when the microprocessor keeps the electric vehicle at the constant speed; and
   an activate acceleration process, wherein when the microprocessor receives the detecting signal for obtaining an acceleration value of a speed condition, the microprocessor increases a speed of the electric vehicle and then keeps the electric vehicle at an updated speed constantly.

8. The electric vehicle power switch method of claim 4, further comprising:
   a power-adjusting process, wherein a speed condition of the electric vehicle is detected and a detecting signal is provided to the microprocessor when the microprocessor keeps the electric vehicle at the constant speed; and
   an activate deceleration process, wherein when the microprocessor receives the detecting signal for obtaining a deceleration value of the speed condition, the microprocessor decreases the speed of the electric vehicle and then keeps the electric vehicle at an updated speed constantly.

* * * * *